J. T. JOHNSON.
BICYCLE PUMP.
APPLICATION FILED JUNE 2, 1913.

1,091,435.

Patented Mar. 24, 1914.
2 SHEETS—SHEET 1.

Witnesses
M. A. Wadhams.
E. H. Jester

Inventor
J. T. Johnson.
By A. Randolph Jr.
Attorney

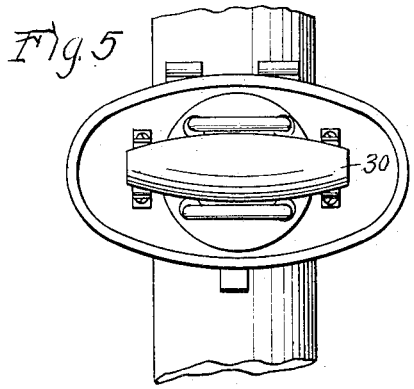
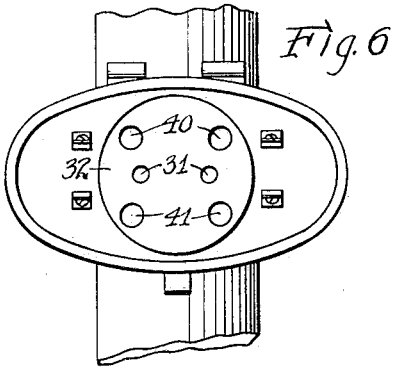
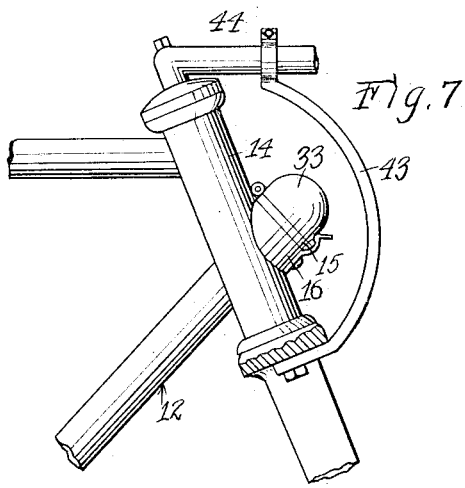
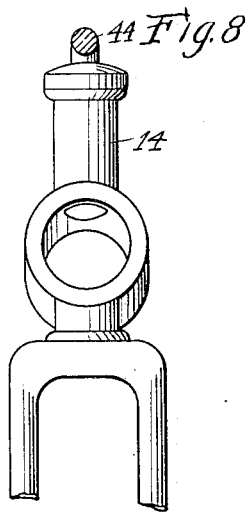
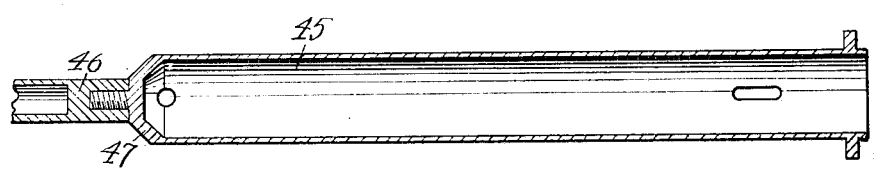

UNITED STATES PATENT OFFICE.

JAMES T. JOHNSON, OF WILLIAMSON, WEST VIRGINIA.

BICYCLE-PUMP.

1,091,435.  Specification of Letters Patent.  Patented Mar. 24, 1914.

Application filed June 2, 1913.  Serial No. 771,272.

*To all whom it may concern:*

Be it known that I, JAMES T. JOHNSON, a citizen of the United States, residing at Williamson, in the county of Mingo and State of West Virginia, have invented certain new and useful Improvements in Bicycle-Pumps; and I do hereby declare the following to be a full, clear, and exact description of the invention, such as will enable others skilled in the art to which it appertains to make and use the same.

This invention comprehends improvements in bicycle pumps and relates more particularly to those of the frame type.

One of the objects of the invention is to provide a bicycle frame pump which shall be contained within one of the tubular frame bars, which will extend through the tubular frame head, and which is so constructed as to not interfere with the proper steering of the vehicle.

The invention also aims to generally improve pumps of this nature to render them more efficient, practical, and commercially desirable.

With these and other objects in view, as will become more apparent as the description proceeds, the invention consists in certain novel features of construction, combination, and arrangement of parts, as will be hereinafter described and claimed.

Figure 1:
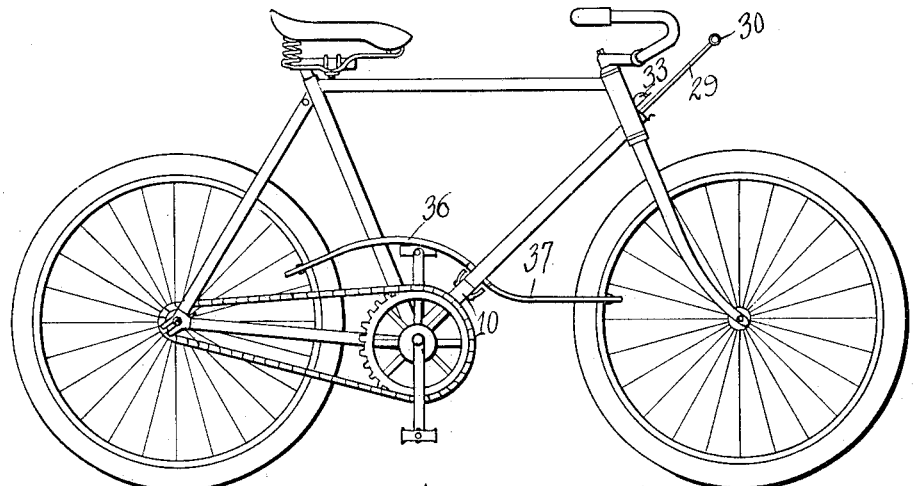
Figure 2:
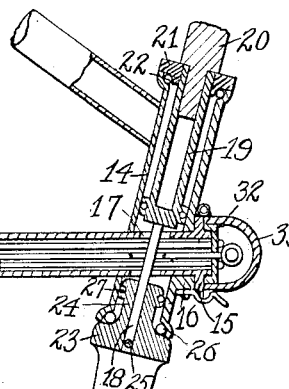
Figure 3:
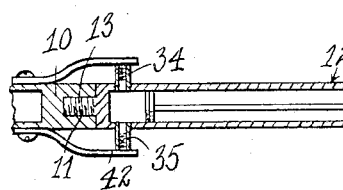
Figure 4:
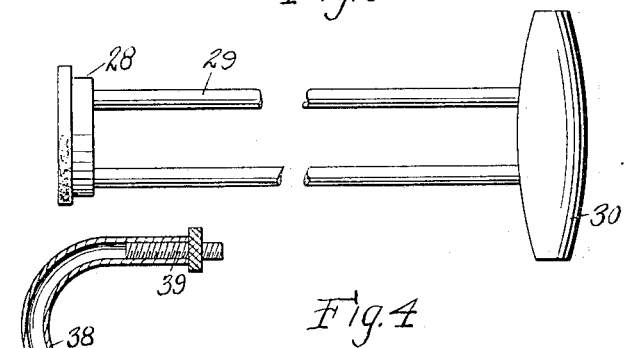

For a complete understanding of my invention, reference is to be had to the following description and accompanying drawings, in which, Figure 1 is a side elevation of a bicycle showing the position of my improved frame pump, Fig. 2 is a longitudinal sectional view through the pump and head of the bicycle, Fig. 3 is an enlarged detail view of the pump piston rods and handle, Fig. 4 is a longitudinal sectional view through one of the connecting tubes and parts carried thereby, Fig. 5 is a fragmentary front elevation of the tubular frame head, the cap being removed to show the pump handle, Fig. 6 is a similar view, the pump handle and connecting tubes not being shown, Fig. 7 is a fragmentary side elevation, partly in section, showing a modification, Fig. 8 is a front elevation of the tubular frame head, and, Fig. 9 is an enlarged sectional view through a slightly modified form of pump cylinder.

In the preferred embodiment of my invention, I provide a bicycle having one of its frame bars formed in sections, the lower section 10 being solid adjacent its upper extremity, as shown in Fig. 2, and provided with an internally threaded socket 11, and the other section, generally designated 12, forms the pump cylinder. The cylinder is closed at its lower end and is formed with a longitudinally projecting stem 13 which threads into the socket 11. The pump cylinder extends through openings formed in the tubular frame head 14 and is provided with an elliptical flange 15 which engages the boss 16 surrounding the opening formed in the forward side of the head piece. The cylinder is formed with openings 17 to permit the passage of the steering rod 18, said rod being formed integrally with the sleeve 19, in the upper end of which the steering post 20 is inserted. A nut 21 is threaded to the upper end of the steering sleeve 19 and rests upon the ball bearings 22 which are held in a ball-race formed by enlarging the upper extremity of the frame head. The crown piece 23 of the front forks is formed with a neck 24 which extends into the lower end of the head 14 and through which the lower end of the steering rod 18 extends and is secured by the pin 25. The ball bearings 26 and 27 space the neck from the interior of the head piece and greatly reduce the amount of friction. The pump piston 28 is actuated by a pair of piston rods 29 which extend on opposite sides of the steering rod 18 and which are connected to the handle 30. The rods extend through the openings 31 formed in the cap 32 which is threaded upon the outer extremity of the pump cylinder, as clearly shown in Fig. 2. A cover 33 is hingedly secured to the upper edge of the flange 15 and swings over the handle 31 when the latter is forced inwardly.

To provide means whereby both of the tires of the bicycle may be simultaneously inflated, I provide the pump cylinder, adjacent its lower end, with the discharge nipples 34 and 35, to which may be respectively connected the tubes 36 and 37, as clearly shown in Fig. 1. Each of these tubes is formed with a metallic neck 38 into which a nipple 39 is threaded so that the neck may be connected to the valves of the tires. When the tubes 36 and 37 are not in use, they are disposed within the cylinder of the pump and the neck pieces 38 are extended through the openings 40 and 41 formed in the cap 32. The spring arms 42 which are pivotally connected to the frame member 10 may be swung so as to close the ends of the nipples 34 and 35 when the pump is not being used.

In Fig. 7 I have shown an arched bar 43 which is used for turning the front forks, being connected to the crown piece and to the angular steering post 44. This construction obviates the necessity of extending a steering member through the head piece of the frame so that the piston may be operated by a single rod.

The pump cylinder 45 illustrated in Fig. 9, is of a greater diameter than the frame member 46 to which it is connected and is tapered adjacent its lower end, as indicated at 47, so as to form a smooth joint with said frame member.

From the foregoing description taken in connection with the accompanying drawings, it will be evident that I have provided a novel frame pump for bicycles, which may be operated so as to inflate both of the tires of the bicycle simultaneously and which when not in use, is contained within the pump cylinder which forms a portion of one of the frame bars.

It is to be understood that while I have shown and described the preferred embodiments of my invention, I do not wish to be limited to these exact constructions, combinations, and arrangements of parts, but may make such changes as will fall within the spirit and scope of the invention as defined by the appended claims.

Having thus described my invention, what I claim is:—

1. In combination with a bicycle having a tubular frame head, a pump cylinder extending through said frame head and forming a portion of one of the frame bars, the cylinder being formed with openings within the frame head, a steering rod extending through said openings, front forks to which the steering rod is connected, and a piston operable within the pump cylinder.

2. In a bicycle, a frame having a tubular head piece, one of the frame bars being formed in sections removably connected, one of said sections forming a pump cylinder and extending through the tubular head piece, the pump cylinder being formed with alined openings within said head piece, a steering rod extending through the openings, front forks to which the steering rod is connected at its lower end, a piston operable within the pump cylinder, and a pair of piston rods extending on opposite sides of the steering rod.

3. In a bicycle, a frame having a tubular head piece and an inclined frame bar formed in sections, the upper of said sections forming a pump cylinder and extending through the tubular head piece, the pump cylinder being formed with alined openings within the tubular head piece, a steering rod extending through said alined openings, a front fork having a neck extending into the lower end of the head piece and connected to the steering rod, and a piston operable within the pump cylinder.

4. In a bicycle, a frame having a tubular head piece, and a frame bar extending through said head piece, said bar forming a pump cylinder, a steering fork fitted in the lower end of the head piece, means extending through the head piece and cylinder to rotatably secure the steering fork in position, and a piston operable within the pump cylinder.

5. In a bicycle, a frame having a tubular head piece and a front bar extending through said head piece and forming a pump cylinder, the cylinder being formed with alined openings within the head piece, a steering rod extending through said openings, a front fork having a neck extending into the lower end of the head piece and rigidly connected to said steering rod, and means for rotatably supporting the steering rod within the head piece.

In testimony whereof I affix my signature in presence of two witnesses.

JAMES T. JOHNSON.

Witnesses:
G. T. CONLEY,
J. B. MILLARD.

Copies of this patent may be obtained for five cents each, by addressing the "Commissioner of Patents. Washington, D. C."